United States Patent
Rayl et al.

(10) Patent No.: US 8,364,380 B2
(45) Date of Patent: Jan. 29, 2013

(54) METHOD AND SYSTEM FOR FUEL INJECTION CONTROL TO REDUCE VARIATION

(75) Inventors: Allen B. Rayl, Waterford, MI (US); Andrew P. Bagnasco, Plymouth, MI (US)

(73) Assignee: GM Global Technology Operations LLC

( * ) Notice: Subject to any disclaimer, the term of this patent is extended or adjusted under 35 U.S.C. 154(b) by 772 days.

(21) Appl. No.: 12/540,744

(22) Filed: Aug. 13, 2009

(65) Prior Publication Data

US 2011/0040472 A1 Feb. 17, 2011

(51) Int. Cl.
*F02D 41/30* (2006.01)

(52) U.S. Cl. .................. 701/103; 701/104; 123/299

(58) Field of Classification Search .......... 701/112–114, 701/102–105; 123/299, 300, 304, 478, 491
See application file for complete search history.

(56) References Cited

U.S. PATENT DOCUMENTS

| | | | | |
|---|---|---|---|---|
| 6,318,334 | B1 * | 11/2001 | Reale et al. | 123/198 DB |
| 7,584,740 | B2 * | 9/2009 | Boyarski | 123/304 |
| 2002/0104512 | A1 * | 8/2002 | Iwasaki et al. | 123/478 |
| 2005/0119819 | A1 * | 6/2005 | Stevens | 701/104 |
| 2007/0079798 | A1 * | 4/2007 | Siewert | 123/299 |
| 2007/0113821 | A1 * | 5/2007 | Kang et al. | 123/299 |
| 2007/0119413 | A1 * | 5/2007 | Lewis et al. | 123/295 |
| 2007/0245818 | A1 * | 10/2007 | Matekunas et al. | 73/118.1 |
| 2008/0072872 | A1 * | 3/2008 | Siewert | 123/299 |
| 2009/0107456 | A1 * | 4/2009 | Pallett et al. | 123/299 |
| 2009/0151692 | A1 * | 6/2009 | He et al. | 123/299 |

OTHER PUBLICATIONS

Wermuth, Nicole et al., "Enhancing Light Load HCCI Combustion in a Direct Injection Gasoline Engine by Fuel Reforming During Recompression," SAE International, 2009-01-0923, Copyright © 2009 SAE International, 14 pages.

Yun, Hanho et al., "Development of Robust Gasoline HCCI Idle Operation Using Multiple Injection and Multiple Ignition (MIMI) Strategy," SAE International, 2009-01-0499, Copyright © 2009 SAE International, 14 pages.

Alt, Matthias et al., "HCCI—from Lab to the Road," Internationales Wiener Motorensymposium 2008, 20 pages.

* cited by examiner

*Primary Examiner* — John T. Kwon
*Assistant Examiner* — Johnny Hoang

(57) ABSTRACT

A method and system for controlling an engine includes a desired fuel mass determination module that determines fuel mass for injection into a cylinder. The system also includes a split determination module that splits the fuel mass into split fuel masses and a pulsewidth determination module that converts the split fuel masses into injection pulsewidths outside of an injector operation exclusion zone.

21 Claims, 4 Drawing Sheets

METHOD AND SYSTEM FOR FUEL INJECTION CONTROL TO REDUCE VARIATION

FIELD

The present disclosure relates to engine control systems, and more particularly to controlling fuel injection quantities of a fuel injector to reduce injection quantity variation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As fuel economy and emissions requirements become stricter, new combustion technologies are being developed. For example, engines are being developed to not only run in spark ignition mode but also a homogenous charge compression ignition (HCCI) mode. The HCCI mode involves compressing a mixture of fuel and an oxidizer to a point of auto-ignition. One of the modes may be selected based on engine speed and load. Another advanced technology is the use of lean stratified operation. Both of these technologies require relatively small fuel injection quantities. Conventional solenoid fuel injector have a large variation of injected fuel quantity when used for metering small quantities.

SUMMARY

The system according to the present disclosure operates the fuel injectors to provide small fuel quantities while avoiding injector operation in an operation exclusion zone in which an injector operates in a non-monotonic manner and has high part to part variation.

In one aspect of the disclosure, a method includes determining fuel mass for injection into a cylinder, splitting the fuel mass into split fuel masses, converting the split fuel masses into injection pulsewidths outside of an injector operation exclusion zone.

In another aspect of the disclosure, a system for controlling an engine includes a desired fuel mass determination module that determines fuel mass for injection into a cylinder, a split determination module that splits the fuel mass into split fuel masses and a pulsewidth determination module that converts the split fuel masses into injection pulsewidths outside of an injector operation exclusion zone.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

Figure 1:
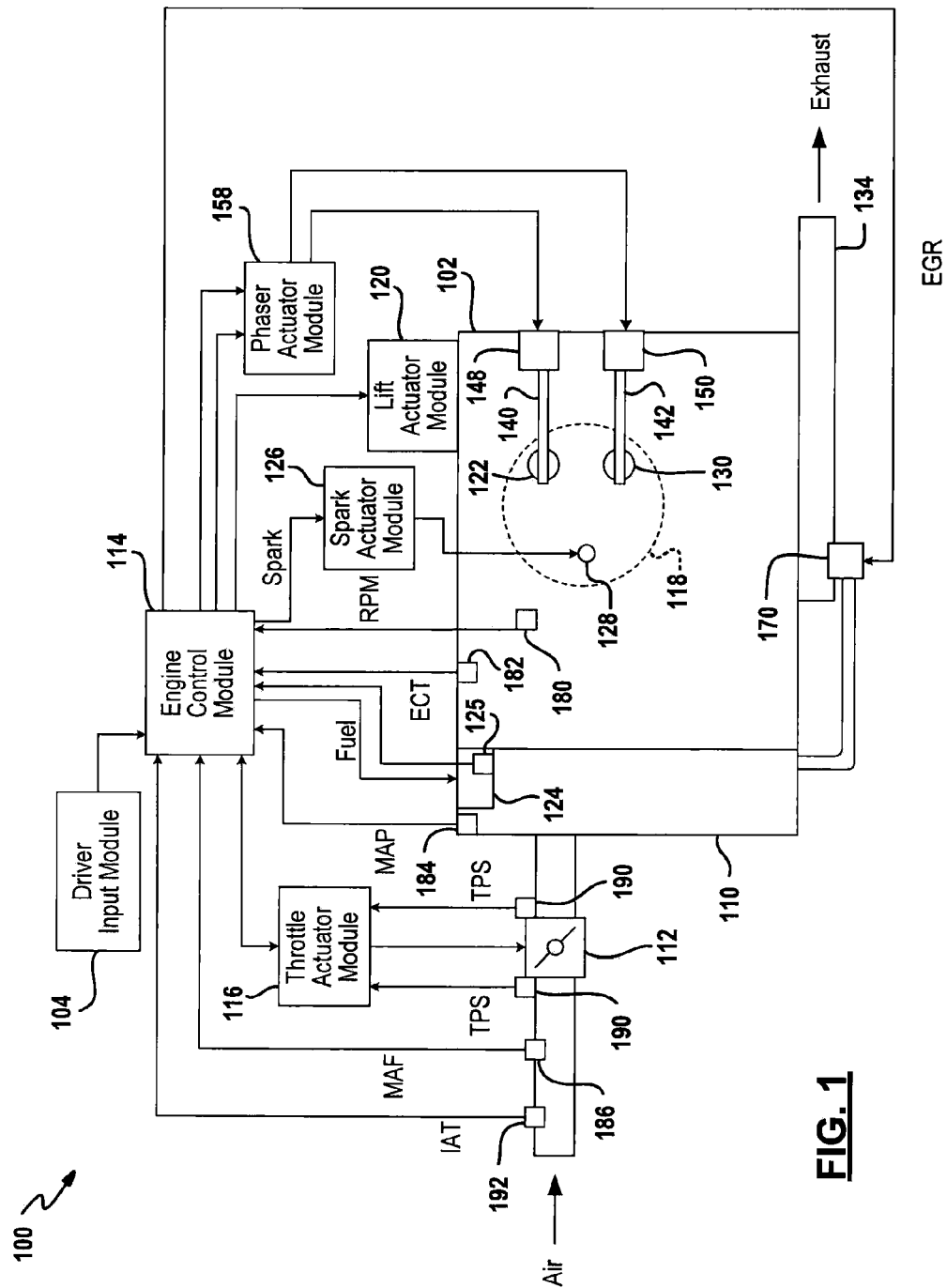
FIG. 1 is a functional block diagram of an engine control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure may operate the gasoline engine in an SI mode, an HCCI mode or a lean stratified mode. The HCCI mode reduces fuel consumption but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating zones may be defined by operating maps in calibration tables.

The engine may be a direct injection gasoline engine and may be selectively operated in the stratified operating mode during the transitions. To operate in the stratified operating mode, the fuel injectors inject the fuel into an area of the cylinder. This approach provides a rich charge in that area that ignites easily and burns quickly and smoothly. The combustion process proceeds to a very lean area (often only air) where the flame-front cools rapidly and nitrogen oxides ($NO_x$) have little opportunity to form. The additional oxygen in the lean charge also combines with carbon monoxide (CO) to form carbon dioxide ($CO_2$).

Referring now to FIG. 1, a functional block diagram of an exemplar engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders. The fuel injection system 124 may include a fuel injector 125. The fuel injector operates using an electrical pulse having a pulsewidth. Typical fuel injectors operate in a normal mode with a pulse from the engine control module 114 that opens the fuel injector to inject an amount of fuel that is directly related to the time period or width of the pulse. In the present disclosure, the pulse from the engine control module 114 is divided into a number of smaller pulses without operating in an injector operation exclusion zone. The injector operation exclusion zone may be a non-linear, non-monotonic region illustrated in FIG. 4.

As illustrated, one fuel injector 125 is provided. However, those skilled in the art will recognize that multiple fuel injectors corresponding to the amount of cylinders in the engine may be provided. As mentioned above, the linear operating region is very accurate and thus has a low standard deviation.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. The lift actuator module 120 adjust the amount of valve lift hydraulically or using other methods.

The engine system 100 may include an exhaust gas recirculation (EGR) valve 170, which selectively redirects exhaust gases back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (riot shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is amount of spark advance or retard. Other actuators include the EGR valve 170, the phaser actuator module 158, and the fuel injection system 124. The term actuator position with respect to these actuators may correspond to, EGR valve opening, intake and exhaust cam phaser angles, air/fuel ratio, respectively.

Figure 2:
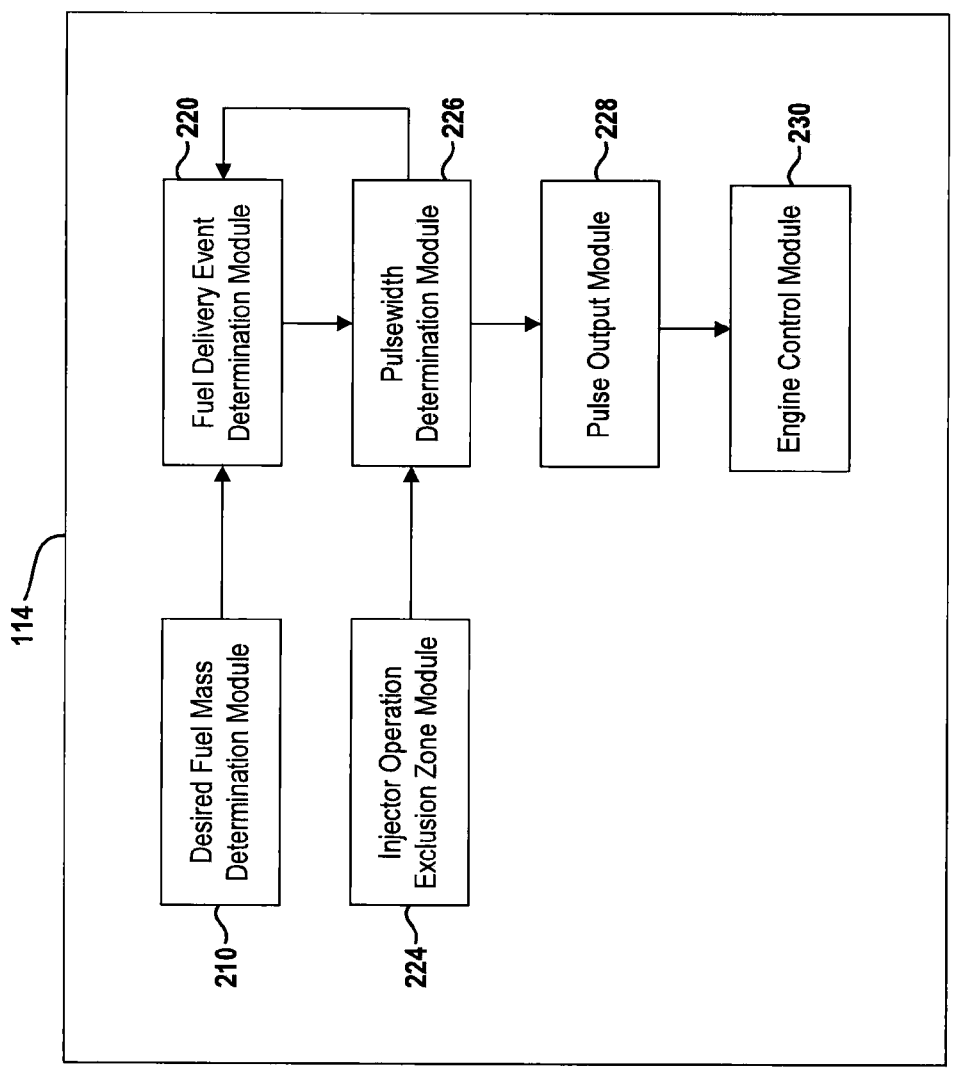
FIG. 2 is a block diagrammatic view of the engine control module of FIG. 1.

Referring now to FIG. 2, a functional block diagram of the engine control module 114 is set forth in further detail. The engine control module 114 includes a desired fuel mass determination module 210. The desired fuel mass determination module 210 determines the total fuel mass for delivery during one engine cycle. The fuel delivery event determination module 220 may partition the desired fuel mass into the desired number of fuel delivery events. These events are at specific crank angles over the engine cycle and are determined by engine speed, load, and desired combustion mode. The number of fuel delivery events for this example is one to three events. The number of fuel delivery events may vary. The number of injections for this example is one to four pulsewidths.

An injector operation exclusion zone module 224 includes parameters for determining the exclusion zone of the injector or injectors. Each of the injectors may have the same injector operation exclusion zone. The injector operation exclusion zone may be determined experimentally and the boundaries of which are stored into a memory. The injector operation exclusion zone may be a zone for operating the injector that includes a non-linear operating zone. The non-linear operating zone may also be non-monotonic. The non-linear operating zone may also exhibit high variability between injectors. The injector operation exclusion zone may be bounded between various fuel masses and various injector duration times. The injector operation exclusion zone may be expanded to include areas of operation of the injector that are non-linear and non-monotonic over various pressure ranges. Each of the operating curves of the various injectors will have a non-linear region within the injector operation exclusion zone.

In the pulsewidth determination module 226, the number of fuel delivery events is converted into pulses corresponding to pulsewidth injection outputs. The pulsewidth determination module 226 may convert the individual fuel delivery events into the pulsewidths while avoiding the injector operation exclusion zone defined within the injector operation exclusion zone module 224. Feedback to the fuel delivery event determination module 220 may be provided by the pulsewidth determination module 226. The feedback may include an indication that the pulsewidth determination for the particular split events may fall within the injector operation exclusion zone and thus the number of pulsewidths and spacing should be changed to avoid the injector operation exclusion zone. When the pulsewidth determination module 226 determines that each of the pulsewidths and spacing of the pulsewidths for controlling the fuel injectors fall outside of the injector operation exclusion zone. The pulse output module 228 controls the operation of the fuel injectors in the order desired. The pulsewidth determination module 226 may determine the start time and end time of each of the injections as well as the spacing between the injections corresponding to the spacing in the fuel operation pulses.

An engine control module 230 controls the operation and timing of the engine including controlling the fuel injectors based upon the pulsewidths determined in the pulsewidth determination module 226.

Figure 3:
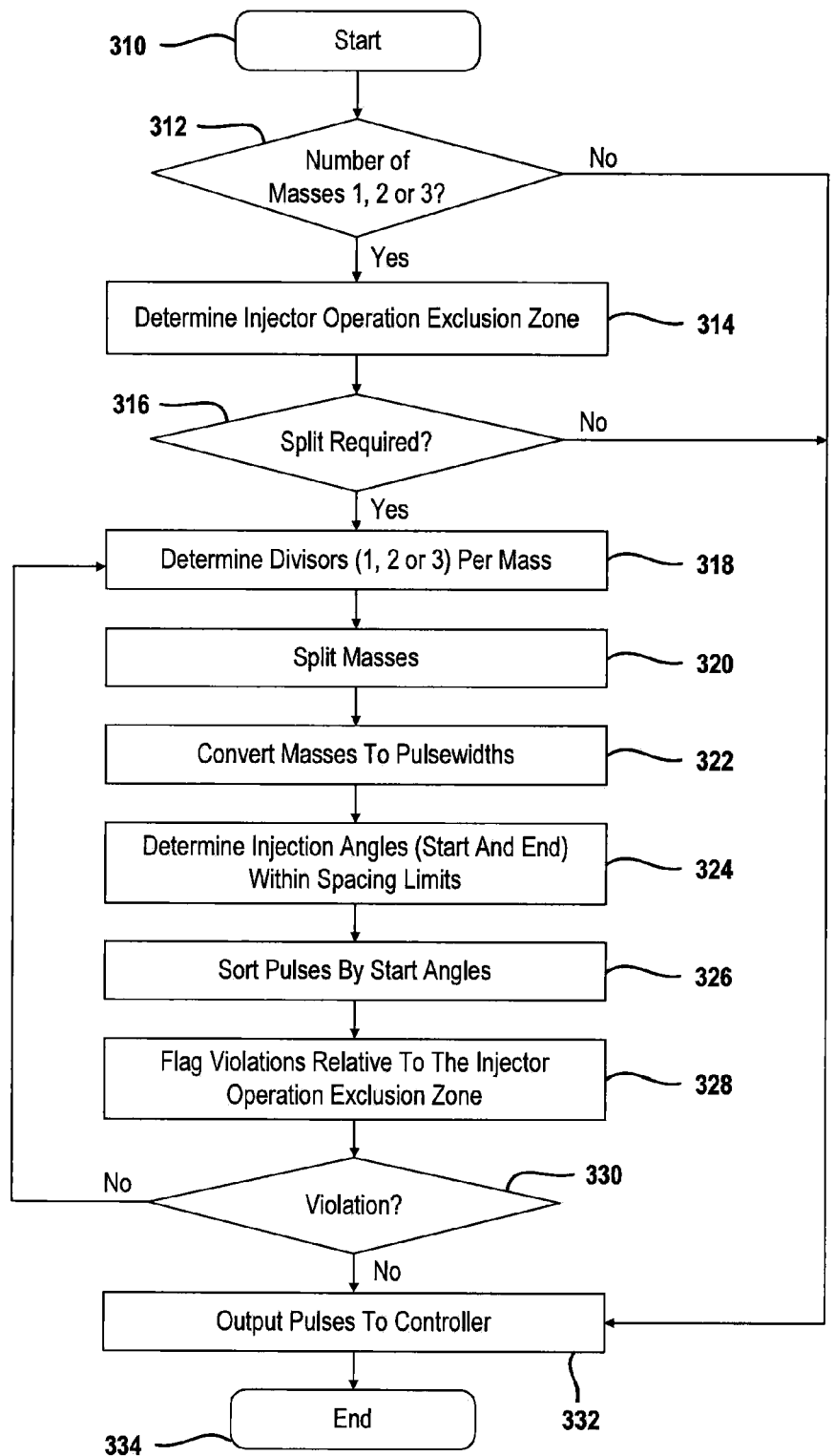
FIG. 3 is a flowchart of a method for operating the disclosure.

Referring now to FIG. 3, a method of operating the present disclosure is set forth. In step 310, the method is started. In step 312, the number of masses is determined. In the following example, one, two or three injection masses may be provided for a fuel delivery event. In step 314, the boundaries of the injector operation exclusion zone are determined. The injector operation exclusion zone may be determined based upon the model of fuel injectors for a vehicle based on fuel pressure and other factors affecting injector accuracy, variation, and performance. Each vehicle may have fuel injectors with the same injector operation exclusion zone. In step 316, it is determined whether or not a split of the injector mass into a number of injection events is required. In step 316, if not split is required, step 332 is performed. If a split is required in step 316, the number of divisors per mass is determined in step 318. Various considerations may be used for determining the number of masses to be used. The sum of the split masses may equal the mass before dividing.

In step 320, the masses are split using the divisors to provide a number of split masses. In step 322, the masses are converted to electrical pulsewidths for controlling the fuel injectors. In step 324, the injection angles corresponding to the start and end of an injection are determined along with the spacing between the injections. In step 326, the pulses are sorted by angles so that the injectors may be controlled in a sequential manner. In step 328, the number of electrical pulses is compared to the injector operation exclusion zone and other limitations such as minimum masses per inject and minimum off time between injections. In step 330, if violations are determined in the exclusion zone which correspond to off dwell, minimum amount of mass or spacing limitations, steps 318-328 may be again performed with a different divisor for splitting the mass into a different number of masses.

In step 332, the electrical pulses determined in step 322 are used to control the fuel injectors. In step 334, the process ends.

After step 312, if zero or four masses are desired, no split is required and step 332 is performed.

By checking the injector operation exclusion zone for the various number of pulsewidths, more accurate fuel injections may be performed.

Figure 4:
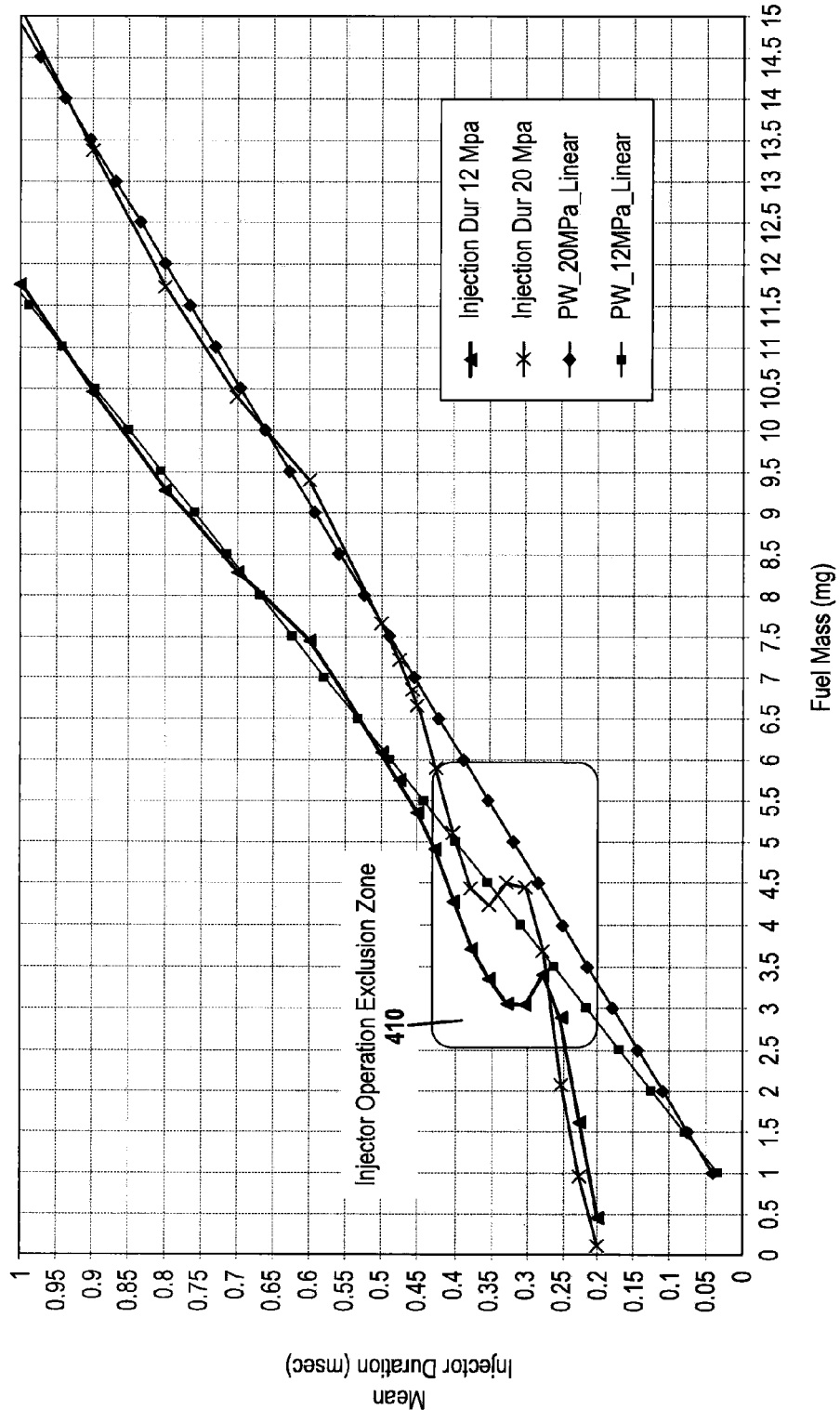
FIG. 4 is a plot of injector pulse duration versus injected mass having a non-linear operation exclusion zone.

Referring now to FIG. 4, an injector operation exclusion zone 410 is illustrated. The injector operation exclusion zone extends between two injector durations and two different fuel masses. The area between the two injector durations and the two fuel masses defines the injector operation exclusion zone. As can be seen, the injector operation exclusion zone is used to exclude operation of the injector in a non-linear operating region of the injector. The injector operation exclusion zone is also a non-monotonic region. The region of the injector operation exclusion zone is non-monotonic because the injector duration required does not always increase as the desired fuel mass increases. This is illustrated by the curved lines for the injectors. Different injectors are illustrated having two different injection pressures such as 12 MPa or 20 MPa.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling a fuel injector of an engine, the method comprising:
   determining a fuel mass to be injected by the fuel injector within one revolution of a crankshaft of the engine;
   determining whether the fuel mass falls within an injector operation exclusion zone;
   in response to the fuel mass falling within the injector operation exclusion zone, selectively splitting the fuel mass into split fuel masses, wherein each of the split fuel masses is associated with an angle of the crankshaft at which the split fuel mass will be injected;
   sorting the split fuel masses based on the associated angles; and
   controlling the fuel injector to sequentially inject the sorted split fuel masses.

2. The method of claim 1 further comprising converting the split fuel masses into fuel injector control pulsewidths and controlling the fuel injector using the fuel injector control pulsewidths.

3. The method of claim 1 wherein each of the split fuel masses is associated with a start angle at which the split fuel mass will begin to be injected and an end angle at which the split fuel mass will finish being infected.

4. The method of claim 3 further comprising:
   determining whether a violation of spacing limits is present between the end angle of any one of the split fuel masses and the start angle of any other of the split fuel masses; and
   adjusting the split fuel masses in response to determining that the violation is present.

5. The method of claim 1 wherein the injector operation exclusion zone corresponds to a non-linear operating region of the fuel injector.

6. The method of claim 1 wherein the injector operation exclusion zone is defined between a lower fuel mass limit and an upper fuel mass limit.

7. The method of claim 1 further comprising adjusting the injector operation exclusion zone in response to fuel pressure.

8. The method of claim 1 wherein the selectively splitting the fuel mass into split fuel masses comprises splitting the fuel masses into between one and three split fuel masses, inclusive.

9. The method of claim 1 wherein the selectively splitting the fuel mass into split fuel masses includes:
   dividing the fuel mass by a first divisor to generate the split fuel masses; and
   determining whether any of the split fuel masses is less than a minimum mass; and
   in response to any of the split fuel masses being less than the minimum mass, dividing the fuel mass by a second divisor to generate the split fuel masses, wherein the second divisor is different than the first divisor.

10. The method of claim 9 wherein the selectively splitting the fuel mass into split fuel masses further includes:
    determining whether a spacing between any two of the split fuel masses is less than a minimum off time; and in response to the spacing between any two of the split fuel masses being less than the minimum off time, dividing the fuel mass by a third divisor to generate the split fuel masses, wherein the third divisor is different than the first divisor.

11. The method of claim 9 wherein the selectively splitting the fuel mass into split fuel masses further includes:
determining whether any one of the split fuel masses falls within the injector operation exclusion zone; and
in response to any one of the split fuel mass falling within the injector operation exclusion zone, dividing the fuel mass by a third divisor to generate the split fuel masses, wherein the third divisor is different than the first divisor.

12. A system for controlling an engine, the system comprising:
a desired fuel mass determination module that determines a fuel mass for injection by a fuel injector of the engine within one revolution of a crankshaft of the engine;
a split determination module that
determines whether the fuel mass falls within an injector operation exclusion zone, and
in response to the fuel mass falling within the injector operation exclusion zone, selectively splits the fuel mass into split fuel masses, wherein each of the split fuel masses is associated with an angle of the crankshaft at which the split fuel mass will be injected;
a pulsewidth determination module that sorts the split fuel masses based on the associated angles; and
an engine control module that controls the fuel injector to sequentially inject the sorted split fuel masses.

13. The system of claim 12 wherein each of the split fuel masses is associated with a start angle at which the split fuel mass will begin to be injected and an end angle at which the split fuel mass will finish being injected.

14. The system of claim 13 wherein the pulsewidth determination module (i) determines whether a violation of spacing limits is present between the end angle of any of the split fuel masses and the start angle of any other of the split fuel masses and (ii) adjusts the split fuel masses in response to the violation being present.

15. The system of claim 12 wherein the injector operation exclusion zone corresponds to a non-linear operating region of the fuel injector.

16. The system of claim 12 wherein the injector operation exclusion zone is defined between a lower fuel mass limit and an upper fuel mass limit.

17. The system of claim 12 wherein the split determination module adjusts the injector operation exclusion zone in response to fuel pressure.

18. The system of claim 12 wherein the split determination module splits the fuel mass into between one and three split fuel masses, inclusive.

19. The system of claim 12 wherein the split determination module:
divides the fuel mass by a first divisor to generate the split fuel masses;
determines whether any of the split fuel masses is less than a minimum mass; and
in response to any of the split fuel masses being less than the minimum mass, divides the fuel mass by a second divisor to generate the split fuel masses, wherein the second divisor is different than the first divisor.

20. The system of claim 19 wherein the split determination module:
determining whether a spacing between any two of the split fuel masses is less than a minimum off time; and
in response to the spacing between any two of the split fuel masses being less than the minimum off time, divides the fuel mass by a third divisor to generate the split fuel masses, wherein the third divisor is different than the first divisor.

21. The system of claim 19 wherein the split determination module:
determines whether any one of the split fuel masses falls within the injector operation exclusion zone; and
in response to any one of the split fuel mass falling within the injector operation exclusion zone, divides the fuel mass by a third divisor to generate the split fuel masses, wherein the third divisor is different than the first divisor.

* * * * *